United States Patent [19]
Hiscox

[11] 3,936,941
[45] Feb. 10, 1976

[54] WHEEL SLIDE PROTECTION SYSTEM

[75] Inventor: Leonard Ramsay Hiscox, Birmingham, England

[73] Assignee: The Lucas Electrical Company Limited, Birmingham, England

[22] Filed: Jan. 11, 1974

[21] Appl. No.: 432,653

[30] Foreign Application Priority Data
Jan. 19, 1973 United Kingdom............... 2820/73

[52] U.S. Cl............................. 303/21 BE; 188/184 A
[51] Int. Cl.²........................................... B60T 8/08
[58] Field of Search............... 188/181 A; 303/20, 21 307/10 R; 317/5; 324/162; 340/53, 62, 262

[56] References Cited
UNITED STATES PATENTS

| | | | |
|---|---|---|---|
| 3,524,685 | 8/1970 | Harned et al. | 303/21 BE |
| 3,532,393 | 10/1970 | Riordan | 303/21 BE |
| 3,642,329 | 2/1972 | Zechnall et al. | 303/21 BE |
| 3,652,136 | 3/1972 | Schlitz et al. | 303/21 BE |
| 3,697,139 | 10/1972 | Elliott et al. | 303/21 P |
| 3,707,311 | 12/1972 | Sharp | 303/21 CG |
| 3,734,573 | 5/1973 | Davis et al. | 303/21 BE X |
| 3,790,227 | 2/1974 | Dozier | 303/21 P X |

*Primary Examiner*—George E. A. Halvosa
*Assistant Examiner*—Stephen G. Kunin
*Attorney, Agent, or Firm*—Holman & Stern

[57] ABSTRACT

A wheel slide protection system removes the brakes from a wheel when the deceleration of the wheel exceeds a predetermined value and re-application of the brakes to the wheel then takes place at a time which is related to the rate of acceleration of the wheel.

5 Claims, 1 Drawing Figure

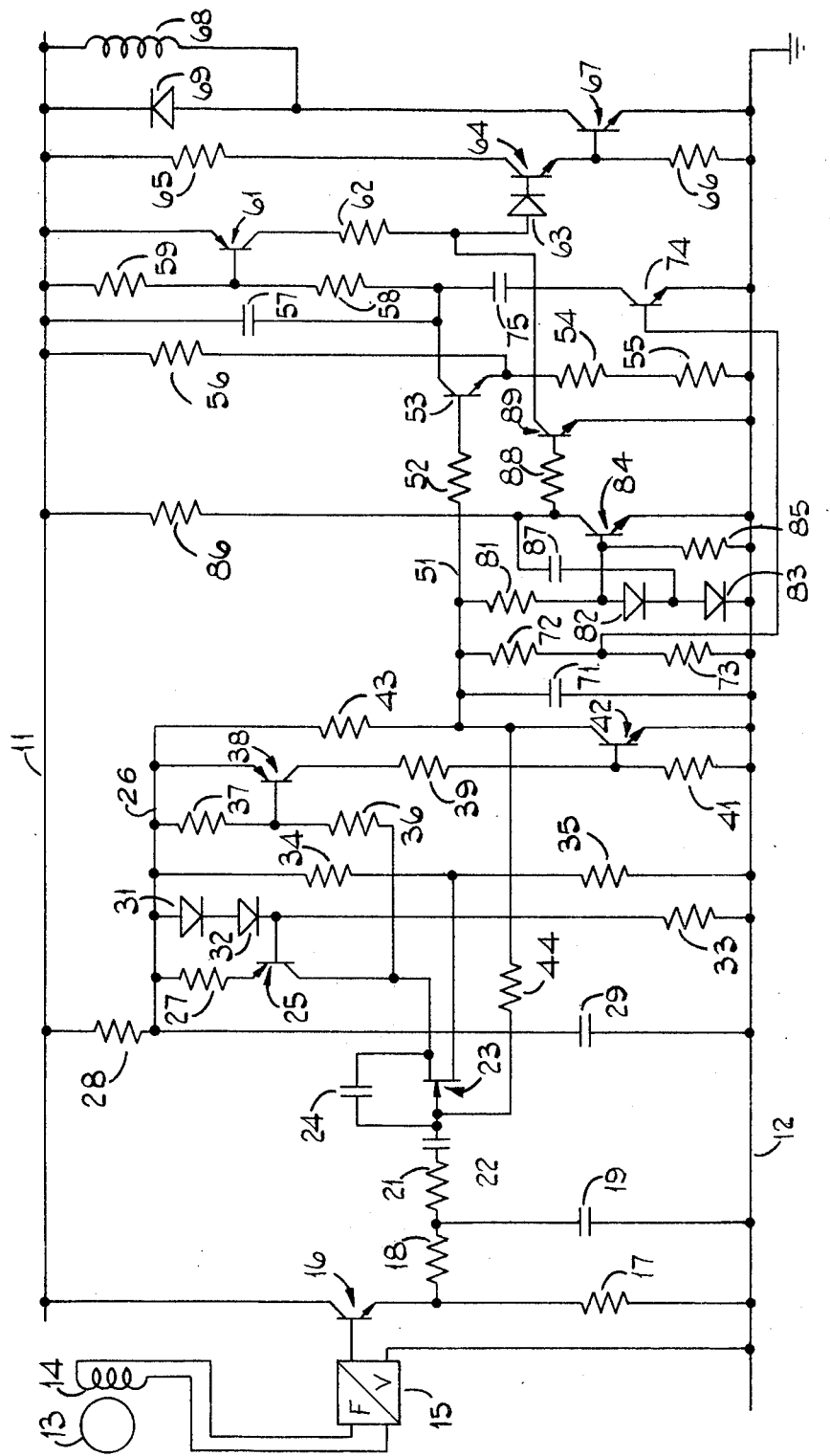

WHEEL SLIDE PROTECTION SYSTEM

This invention relates to wheel slide protection circuits, particularly, but not exclusively, for road vehicles.

A circuit according to one aspect of the invention comprises in combination switch means driven from a first state to a second state when the deceleration of the wheel exceeds a predetermined value and driven back to its first state when the wheel accelerates, control means coupled to the switch means and normally occupying a first state, the control means being driven to a second state when the switch means is in its second state and then effecting release of the brakes from the wheel, and circuit means operable when the switch means reverts to its first state to maintain the control means in its second state for a period of time inversely related to the rate of acceleration of the wheel.

A circuit according to another aspect of the invention comprises means for producing an electrical signal having a value dependent on the rotational speed of the wheel, a differentiating circuit to which said signal is applied, said differentiating circuit producing an output dependent upon the rate of change of rotational speed of the wheel, means operable by the output from the differentiating circuit for releasing the brakes from the wheel when the deceleration of the wheel reaches a value such that the wheel is liable to slide, and for reapplying the brakes when the wheel accelerates subsequent to release of the brakes, and timing means responsive to the rate of acceleration of the wheel for ensuring that the brakes remain off for a predetermined period of time which decreases as the rate of acceleration of the wheel increases.

The accompanying drawing is a circuit diagram, partly in block form, illustrating one example of the invention.

Referring to the drawing, there are provided positive and negative supply lines 11, 12, powered by the battery of a road vehicle, but line 12 conveniently being earthed. One of the wheels of the vehicle is indicated diagrammatically at 13, and associated with the wheel is a toothed member which produces pulses in a pick-up winding 14, the frequency of the pulses produced in the winding 14 being proportional to the rotational speed of the wheel. The output from the winding 14 is fed to a frequency to voltage converter 15 of any convenient known form, the output from the converter 15 being a d.c. voltage proportional to the rotation speed of the wheel. The converter 15 conveniently comprises a transistor pump circuit.

One output terminal of the converter 15 is connected to the line 12, and its other output terminal is connected to the base of an n-p-n transistor 16, the collector which is connected to the line 11 and the emitter of which is connected through a resistor 17 to the line 12. The emitter of the transistor 16 is further connected to the line 12 through a resistor 18 and a capacitor 19 in series, and the junction of the resistor 18 and capacitor 19 is connected through a resistor 21 and a capacitor 22 in series to the gate of a field effect transistor 23. The gate and drain of the transistor 23 are interconnected through a capacitor 24, and the drain is further connected to the collector of a p-n-p transistor 25 having its emitter connected to a supply line 26 through a resistor 27. The line 26 is connected to the junction of a resistor 28 and a capacitor 29 connected in series between the lines 11, 12. Connected between the lines 26, 12 are a pair of diodes 31, 32 and a resistor 33 in series, the junction of the diode 32 and resistor 33 being connected to the base of the transistor 25. Also connected between the lines 26, 12 are a pair of resistors 34, 35 in series, the junction of the resistors 34, 35 being connected to the source of the transistor 23. Moreover, the collector of the transistor 25 is connected through a resistor 36 and a resistor 37 in series to the line 26, the junction of the resistor 36, 37 being connected to the base of a p-n-p transistor 38, the emitter of which is connected to the line 26 and the collector of which is connected through resistors 39, 41 in series to the line 12. The junction of the resistors 39, 41 is connected to the base of an n-p-n transistor 42, the emitter of which is connected to the line 12 and the collector of which is connected to the line 26 through a resistor 43, and to the gate of the transistor 23 through a resistor 44.

The collector of the transistor 42 is connected to a line 51 which is coupled through a resistor 52 to the base of an n-p-n transistor 53 having its emitter connected to the line 12 through resistors 54, 55 in series, and its collector connected to the line 11 through three parallel paths containing respectively a resistor 56, a capacitor 57, and a pair of resistors 58, 59 in series. The junction of the resistors 58, 59 is connected to the base of a p-n-p transistor 61, the emitter of which is connected to the line 11 and the collector of which is connected through a resistor 62 and a diode 63 in series to the base of an n-p-n transistor 64, the collector and emitter of which are connected to the lines 11, 12 respectively through resistors 65, 66. The emitter of the transistor 64 is further connected to the base of an n-p-n transistor 67 and its emitter connected to the line 12 and its collector connected through a solenoid 68 to the line 11, the solenoid 68 being bridged by a freewheel diode 69.

The potential on the line 51 is smoothed by a capacitor 71 connected between the line 51 and the line 12. There are a number of further components connected between the lines 51, 12, but for the moment the operation of the circuit will be described as if these components are not present.

The output from the converter 15, it will be recalled, is a voltage proportional to the rotational speed of the wheel 13. This voltage turns on the transistor 16, which provides an input to an amplifier constituted by the transistors 23, 25, 38, 42, the amplifier having a feedback path by way of the resistor 44, and serving to differentitate its input signal and provide at the collector of the transistor 42, that is to say on the line 51, a signal representing the rate of change of the rotational speed of the wheel. It will be seen that the base potential of the transistor 25 is set by the diodes 31, 32 and the resistor 33, and the transistor 25 serves in conjunction with the transistor 23 to determine the conduction level of the transistor 38, which in turn determines the conduction of the transistor 42. When the wheel 13 is neither accelerating or decelerating, the potential on the line 51 will be at a set value between the potentials on the lines 11, 12. When the wheel decelerates, the potential on the line 51 increases. When the wheel accelerates, the potential on the line 51 decreases, that is to say approaches the potential on the line 12.

The emitter potential of the transitor 53 is set by the resistors 56, 54, 55, and when the wheel 13 is not accelerating or decelerating, the transistor 53 is off, so that no base current is provided to the transistor 61. As a result, no base current is provided to the transistors 64, 67, which are both off, so that no current flows in the solenoid 68.

If the brakes of the vehicle are applied, the signal on the line 51 rises towards the potential of the line 11, by an amount dependent on the level of deceleration and if the deceleration of the wheel reaches a value such that the wheel is about to slide, then the potential at the base of the transistor 53, becomes sufficiently high to turn the transistor 53 on. As soon as the transistor 53 conducts, it turns on the transistor 61, which in turn provides base current to the transistors 64 and 67, so that the solenoid 68 is energised. Energisation of the solenoid 68 operates a valve in the braking system to release the braking pressure from the wheel. Moreover, the amplifier constituted by the transistors 23, 42 and their associated components saturates, so that there is no further feedback by way of the resistor 44, and the capacitor 22 charges to a level dependent on the wheel slip. In other words, the charge developed across the capacitor will be a measure of the nature of the road surface.

When the braking pressure is reliever from the wheel, the wheel can accelerate again, and after a delay, the potential on the line 51 falls sufficiently to allow the transistor 53 to be turned off again, so that the transistor 61 is turned off and the transistors 64 and 67 turn off and the solenoid 68 is no longer energised. The brakes are now applied again. The length of the delay depends on the charge across the capacitor 22. On a good road surface, providing a good grip between the tire and the road, the delay will be shorter than on a smooth road surface, because during deceleration on a smooth road surface the capacitor 22 will charge more than during deceleration on a good road surface. Thus, the arrangement described automatically increases the delay on a smooth road surface so that on a smooth road surface the wheel has longer to accelerate. Nevertheless, it is found that with some vehicles having high inertia, the increased delay on a smooth road surface is still not sufficient to ensure that the rotational speed of the wheel at the instant when the brakes are reapplied is sufficiently high.

With a view to overcoming this difficulty, a pair of resistors 72, 73 are connected in series between the line 51 and the line 12. The junction of the resistor 72, 73 is connected to the base of an n-p-n transistor 74, the emitter of which is connected to the line 12 and the collector of which is connected through a capacitor 75 to the collector of the transistor 53.

When the wheel 13 is neither accelerating or decelerating, current can flow to the base of the transistor 74 by way of the resistor 72, and the transistor 74 is on so that the capacitor 75 is charged. However, when the brakes are applied and the deceleration exceeds the predetermined level, so that the transistor 53 turns on, then the capacitor 75 discharges by way of the transistor 53 and is held discharged. When the wheel starts to accelerate again following release of the braking pressure, then when the transistor 53 turns off, the capacitor 75 will be in a discharged state. The transistor 74 is arranged to turn off at an acceleration level in excess of the accleration level necessary to turn off the transistor 53. In other words, as the potential on the line 51 falls during acceleration, the transistor 74 turns off at a lower potential on the line 51 than the transistor 53. While the transistor 53 is off but the transistor 74 is on, then the capacitor 75 charges through the emitter-base of the transistor 61 and the resistor 58, and this charge current holds the transistor 61 on. The capacitor 75 takes a predetermined time to charge completely, and on an extremely smooth road surface, the transistor 74 may not turn on during this predetermined period of time. During the time when the capacitor 75 is charging, the transistor 61 still conducts, and so the transistors 64 and 67 are on. Thus, in an extreme condition when the transistor 74 does not turn on while the capacitor 75 is charging, then there will be a delay between turning off of the transistor 53 and re-application of the braking pressure, this delay being equal to the time taken for the capacitor 75 to charge. This delay is of course additional to the delay provided by the capacitor 22. Thus, on a very smooth road surface, as compared with an arrangement without the capacitor 75 the brakes are held off longer and so the rotational speed of the wheel at the instant when the braking pressure is reapplied is greater.

On a very good road surface providing an excellent grip, the transistor 74 will turn off almost immediately after the transistor 53, because the potential on the line 51 is falling rapidly. In these circumstances, the capacitor 75 has virtually no effect on the circuit operation, because once the transistor 74 turns off there is no charging path for the capacitor 75 and the transistor 61 turns off. Between the two extreme situations, conditions can arise at which the transistor 74 turns on at some point in the charging cycle of the capacitor 75. Thus an additional delay is provided which is dependent on the nature of the road surface, and decreases as the rate of acceleration of the wheel increases.

The amplifier constituted by the transistors 61, 64, 67 and their associated components effectively constitutes control means having a first state in which the transistors are off and a second state in which the transistors are on. In the second state, the brakes are released from the wheel. The transistor 53 constitutes switch means which normally occupies a first state in which it is non-conductive, but at a predetermined deceleration level occupies a second state in which it is conductive, the transistor 53 then driving the control means to its second state. The transistor 53 turns off again when the wheel accelerates. There is also circuit means constituted by the transistor 74 and the capacitor 75. The transitor 74 is on during acceleration and is turned off at an acceleration level greater than the acceleration level at which the transistor 53 turns off. The time between turning off of the transistor 53 and turning off of the transistor 74 is of course dependent upon the rate of acceleration. The circuit means 74, 75 holds the control means in its second state for a period of time which is inversely related to the rate of acceleration of the wheel, because the greater the rate of acceleration, the sooner the transistor 74 turns off after the transistor 53 turns off. However, the capacitor 75 also restricts the maximum time for which the control means can be in its second state. Clearly, the capacitor 75 also performs the function of preventing the transistor 74 from providing an input to the control means when the transistor 53 is off.

The circuit also incorporates an inhibiting circuit to prevent the brakes from being held in the release condition unnecessarily when the vehicle is travelling over a rough surface. By way of example, with a vehicle travelling over a cobbled road, a wheel will decelerate as it travels up the cobbled stone, and accelerate as it travels down the cobbled stone. If the vehicle is being braked at the time, then the mean rotational speed of the wheel will be decreasing, and so there will be a deceleration signal. However, superimposed upon this signal will be acceleration and deceleration signals at a much greater frequency as a result of the acceleration and deceleration caused by the cobble stones. Not only are these signals at a very high frequency, but they are at a substantial magnitude, certainly sufficient to energise the solenoid 68. Thus, if a situation is imagined in which the mean deceleration is such that the wheel is not likely to slip, so that the solenoid 68 should not be energised, nevertheless, the solenoid 68 will be energised and de-energised rapidly as a result of the high frequency signals resulting from the wheel travelling over the cobble stones. Moreover, because the brakes on a vehicle wheel take longer to apply than to release, a situation is found to be reached quickly in which the brakes are in fact held off permanently, so that the braking effort is lost.

In order to overcome this problem, the circuit includes a resistor 81 and a pair of diodes 82, 83 connected in series between the lines 51, 12. The junction of the resistor 81 and diode 82 is connected to the base of an n-p-n transistor 84, the base of which is further connected to the line 12 through a resistor 85, the emitter of which is connected to the line 12, and the collector of which is connected to the line 11 through a resistor 86. A capacitor 87 is connected between the collector of the transistor 84 and the junction of the diodes 82, 83, and the collector of the transistor 84 is also connected through a resistor 88 to the base of an n-p-n transistor 89 having its emitter connected to the line 12 and its collector connected to the base of the transistor 64 through the diode 63.

The transistor 84 is normally held on by current flowing through the resistors 28, 43, 81. Conduction of the transistor 84 removes base current from the transistor 89, and so the transistor 89 has no effect.

When the vehicle decelerates, the potential on the line 51 rises as previously explained, and the transistor 84 stays on. However, when the wheel accelerates, and the potential on the line 51 falls, the transistor 53 turns off as previously explained so that the solenoid 68 is deenergised and the brakes are re-applied. Moreovoer, when the wheel accelerates, the transistor 84 turns off, whereupon the capacitor 87 is charged by way of the resistor 86 and the diode 83. While the transistor 84 is off, the transistor 89 is turned on by current flowing through the resistors 86, 88, but since the transistor 64 is already off, the transistor 89 has no effect at this stage.

As the wheel decelerates again as a result of re-application of the brakes, the potential on the line 51 will rise and turn on the transistor 53. However, when the wheel decelerates the transistor 84 is not turned on immediately, but is held off for a predetermined period of time while the capacitor 87 discharges. During this predetermined period of time, the transistor 89 conducts, and should the transistor 53 turn on during the predetermined period of time, it will not result in conduction of the transistor 64, because the current flowing through the transistor 61 is diverted through the transistor 89. Thus, if the predetermined deceleration is exceeded during the predetermined period of time, the brakes will not be released. Since the frequency with which the brakes are released on a cobbled surface is much higher than the frequency with which the brakes would be released during a normal braking operation when the wheel is likely to slip, the predetermined period of time can readily be chosen such that if the wheel is on a good surface and is about to slip, then by the time the predetermined deceleration has been exceeded for the second time, the capacitor 87 will have been discharged and so the transistor 89 will be off by the time the transistors 53, 61 turn on. However, on a cobbled surface, the transistor 53 will turn on well before the transistor 89 has turned off, so that the inhibition explained above will be effected.

The resistor 85 sets the acceleration level at which the inhibit timer resets.

I claim:

1. A wheel slide protection circuit comprising in combination first switch means driven from a first state to a second state when the deceleration of the wheel exceeds a predetermined value and driven back to its first state when the wheel accelerates, control means coupled to the first switch means and normally occupying a first state, the control means being driven to a second state when the first switch means is in its second state and then effecting release of the brakes from the wheel, the maximum time for which the control means is in its second state after the first switch means reverts to its first state being restricted, and circuit means operable when the first switch means reverts to its first state to maintain the control means in its second state for a period of time inversely related to the rate of acceleration of the wheel, said circuit means including second switch means driven from a first state to a second state at an acceleration level greater than the acceleration level at which the first switch means reverts to its first state, the control means reverting to its first state when the second switch means is driven to its second state, and in which the circuit means includes a capacitor which is held discharged while the first switch means is in its second state but when the first switch means reverts to its first state charges by way of the second switch means, the charging current of the capacitor holding the control means in its second state, whereby the control means remains in its second state until either the capacitor is charged or the second switch means is driven to its second state.

2. A circuit as claimed in claim 1 in which the first switch means is a transistor which is off and on in its first and second states respectively and when on provides an input signal to an amplifier constituting said circuit means.

3. A circuit as claimed in claim 2 in which the second switch means is a transistor which is on and off in its first and second states respectively and when on provides an input signal to the amplifier by way of said capacitor.

4. A wheel slide protection circuit comprising means for producing an electrical signal having a value dependent on the rotational speed of the wheel, a differentiating circuit to which said signal is applied, said differentiating circuit producing an output signal dependent upon the rate of change of rotational speed of the wheel, first switch means operable by way of the output signal from the differentiating circuit for releasing the brakes from the wheel when the deceleration of the wheel reaches a value at which the wheel is liable to slide, and for permitting re-application of the brakes when the wheel accelerates subsequent to release of the brakes, and timing means responsive to the rate of acceleration of the wheel subsequent to release of the brakes for ensuring that when said rate of acceleration of the wheel is below a predetermined value, the brakes are held off for a predetermined period of time after the differentiating circuit output signal permits re-application of the brakes said timing means comprising a capacitor and a second switch means responsive to said rate of acceleration and through which said capacitor may be discharged if said rate of acceleration exceeds said predetermined value, said predetermined period of time determined by the charging rate of said capacitor.

5. A wheel slide protection circuit for a wheel of a road vehicle, comprising in combination first and second d.c. supply lines, means for producing an electrical signal having a value dependent on the rotational speed of the wheel, a differentiating circuit to which said signal is applied, said differentiating circuit producing an output signal dependent upon the rate of change of rotational speed of the wheel, the output signal differentiating circuit being a d.c. signal having a value intermediate the potentials of the first and second supply lines when the wheel is rotating at a constant speed, this potential approaching the potential of the first line when the wheel decelerates and approaching the potential of the second line when the wheel accelerates, a first transistor coupled to the output from the differentiating circuit and biased to be off when the wheel is rotating at a constant speed, the first transistor being turned on by the potential at the output of the differentiating circuit when the deceleration of the wheel exceeds a predetermined value with which the wheel is likely to slide, an amplifier which is operated when the first transistor turns on and releases the brakes from the wheel, a second transistor which is coupled to the output from the differentiating circuit and is also coupled to the amplifier by way of a capacitor, the second transistor being conductive when the wheel is rotating at a constant speed, and remaining conductive when the wheel decelerates, but the capacitor de-coupling the second transistor from the amplifier, the first transistor serving when it is conductive to discharge the capacitor so that when the first transistor turns off again the second transistor provides an input to the amplifier by way of the capacitor, the second transistor being arranged to turn off at an acceleration level which is greater than the acceleration level at which the first transistor turns off.

\* \* \* \* \*